(12) United States Patent
Park et al.

(10) Patent No.: US 9,723,198 B2
(45) Date of Patent: Aug. 1, 2017

(54) CAMERA MODULE AND AUTO FOCUSING METHOD OF CAMERA MODULE

(71) Applicant: LG INNOTEK CO., LTD., Seoul (KR)

(72) Inventors: Sang Ok Park, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/228,365

(22) Filed: Aug. 4, 2016

(65) Prior Publication Data
US 2016/0344923 A1 Nov. 24, 2016

Related U.S. Application Data

(63) Continuation of application No. 13/717,252, filed on Dec. 17, 2012, now abandoned.

(30) Foreign Application Priority Data

Dec. 29, 2011 (KR) .......................... 10-2011-0145806
Dec. 29, 2011 (KR) .......................... 10-2011-0145807

(51) Int. Cl.
H04N 5/232 (2006.01)
H04N 5/225 (2006.01)
G03B 13/36 (2006.01)
G02B 7/09 (2006.01)
G02B 7/28 (2006.01)

(52) U.S. Cl.
CPC ........... *H04N 5/23212* (2013.01); *G02B 7/09* (2013.01); *G02B 7/28* (2013.01); *G03B 13/36* (2013.01); *H04N 5/2251* (2013.01); *H04N 5/2257* (2013.01); *H04N 5/232* (2013.01)

(58) Field of Classification Search
None
See application file for complete search history.

(56) References Cited

U.S. PATENT DOCUMENTS

| | | | |
|---|---|---|---|
| 2008/0031609 A1 | 2/2008 | Rukes | |
| 2008/0124068 A1* | 5/2008 | Kwon | ...................... G02B 7/38 396/127 |
| 2008/0297922 A1 | 12/2008 | Lule | |

(Continued)

OTHER PUBLICATIONS

Office Action dated Feb. 12, 2015 in U.S. Appl. No. 13/717,252.

*Primary Examiner* — Roberto Velez
*Assistant Examiner* — Quan Pham
(74) *Attorney, Agent, or Firm* — Saliwanchik, Lloyd & Eisenschenk

(57) ABSTRACT

A camera module and an auto focusing method of the camera module are provided, the camera module including a VCM (Voice Coil Motor) including a rotor including a lens distanced from a reference plane, in a case no driving signal is applied, a posture detection sensor determining a posture of the VCM; an ISP (Image Signal Processor) generating a driving signal for driving the VCM using an optimum focus value of the lens calculated by an auto focus algorithm in response to a posture of the VCM determined by the posture detection sensor, an image sensor changing lens-passed light to a digital signal, and a controller controlling the VCM, the posture detection sensor, the image signal processor and the image sensor.

6 Claims, 9 Drawing Sheets

(56) References Cited

U.S. PATENT DOCUMENTS

2009/0102403 A1    4/2009   Lule
2010/0222046 A1    9/2010   Cumming
2013/0076967 A1    3/2013   Brunner et al.

* cited by examiner

CAMERA MODULE AND AUTO FOCUSING METHOD OF CAMERA MODULE

CROSS-REFERENCE TO RELATED APPLICATIONS

This application is a continuation of U.S. application Ser. No. 13/717,252, filed Dec. 17, 2012; which claims the benefit under 35 U.S.C. §119 of Korean Patent Application Nos. 10-2011-0145806 and 10-2011-0145807, filed Dec. 29, 2011, which are hereby incorporated by reference in their entirety.

BACKGROUND

Field of the Invention

The present disclosure relates to a camera module configured to be driven to one direction or to a bi-direction, and an auto focusing method of a camera module.

Description of Related Art

Recently, a mobile phone embedded with a super small digital camera and a tablet PC has been developed. A conventional super small digital camera used on a mobile phone has suffered from a disadvantage of disablement to adjust a gap between a lens and an image sensor changing an outside light to a digital image or a digital video (moving image). However, recently, a lens driving device, such as a VCM (Voice Coil Motor) capable of adjusting a gap between an image sensor and a lens, has been developed to obtain a digital image or a digital video that is more improved and advanced than that of a conventional super small digital camera.

Generally, a VCM (Voice Coil Motor) applied to a camera module is mounted therein with a rotor mounted with a lens, where the rotor vertically moves upwards from a base to adjust a gap between an image sensor arranged at a rear surface of the base and a lens of the camera. Recently, a bi-directional VCM has been developed capable of accomplishing an auto focusing by floating a rotor of the VCM from a base and moving the rotor downwards or upwards.

A conventional VCM is configured such that an elastic member depresses a rotor for contact with a base when no driving signal is applied. A rotor of a conventional bi-directionally driven VCM has an approximately 30 µm~50 µm displacement depending on self-weight of the rotor and posture of the VCM.

However, the rotor according to the conventional bi-directionally driven VCM is disadvantageous in that, although the rotor has a displacement depending on the posture of the VCM, and even if no driving signal is applied, the rotor includes a non-driving section, the auto focus operation is performed by auto focusing algorithm not reflected with the displacement, thereby taking lots of time for auto focusing and consuming lot of currents.

BRIEF SUMMARY

The present invention is directed to provide a camera module configured to determine a displacement of a rotor depending on posture of a VCM having a bi-directionally driven rotor, and to determine a non-driving section where the rotor is not driven even if a driving signal is applied, skipping an auto focusing at the non-driving section to thereby shorten an auto focusing time, and an auto focusing method of a camera module.

The present invention is also directed to provide a camera module configured to determine a displacement of a rotor depending on posture of a VCM, and to determine a non-driving section where the rotor is not driven even if a driving signal is applied, skipping an auto focusing at the non-driving section to thereby shorten an auto focusing time, and an auto focusing method of a camera module.

Technical problems to be solved by the present disclosure are not restricted to the above-mentioned descriptions, and any other technical problems not mentioned so far will be clearly appreciated from the following description by skilled in the art.

In one general aspect of the present invention, there is provided an auto focusing method of a camera module, the method comprising: determining a posture of a rotor, in a case a driving current is not applied; determining a non-driving section of the rotor where the rotor is not driven even if a driving current is applied in response to the posture of the rotor, and determining a driving section of the rotor where driving is started by the driving current; and skipping an auto focusing of the non-driving section and performing an auto focusing of the driving section.

In another general aspect of the present disclosure, there is provided an auto focusing of a camera module, the method comprising: determining a posture of a rotor, in a case a driving current is not applied; selecting any one of a plurality of auto focus algorithms in response to the posture of the rotor; and skipping an auto focusing of the non-driving section of the rotor where the rotor is not driven even if a driving current is applied in response to the selected auto focus algorithm, and performing the auto focus from a driving section of the rotor where the rotor is driven by the driving current.

In still another general aspect of the present disclosure, there is provided a camera module, the camera module comprising: a VCM (Voice Coil Motor) including a rotor including a lens distanced from a reference plane, in a case no driving signal is applied; a posture detection sensor determining a posture of the VCM; an ISP (Image Signal Processor) generating a driving signal for driving the VCM using an optimum focus value of the lens calculated by an auto focus algorithm in response to a posture of the VCM determined by the posture detecting sensor; an image sensor changing lens-passed light to a digital signal; and a controller controlling the VCM, the posture detection sensor, the image signal processor and the image sensor.

The VCM according to the present disclosure has an advantageous effect in that a displacement of a rotor is determined depending on posture of a VCM having a bi-directionally driven rotor, and a non-driving section is determined where the rotor is not driven even if a driving signal is applied, and an auto focusing is skipped at the non-driving section to thereby shorten an auto focusing time.

BRIEF DESCRIPTION OF THE DRAWINGS

In the drawings, the width, length, thickness, etc. of components may be exaggerated or reduced for the sake of convenience and clarity. Furthermore, throughout the descriptions, the same reference numerals will be assigned to the same elements in the explanations of the figures, and explanations that duplicate one another will be omitted. Now, a voice coil motor according to the present disclosure will be described in detail with reference to the accompanying drawings.

The teachings of the present disclosure can be readily understood by considering the following detailed description in conjunction with the accompanying drawings, in which.

DETAILED DESCRIPTION

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

The meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Now, exemplary embodiments of the present disclosure will be explained in detail together with the figures.

First Exemplary Embodiment

Figure 1:
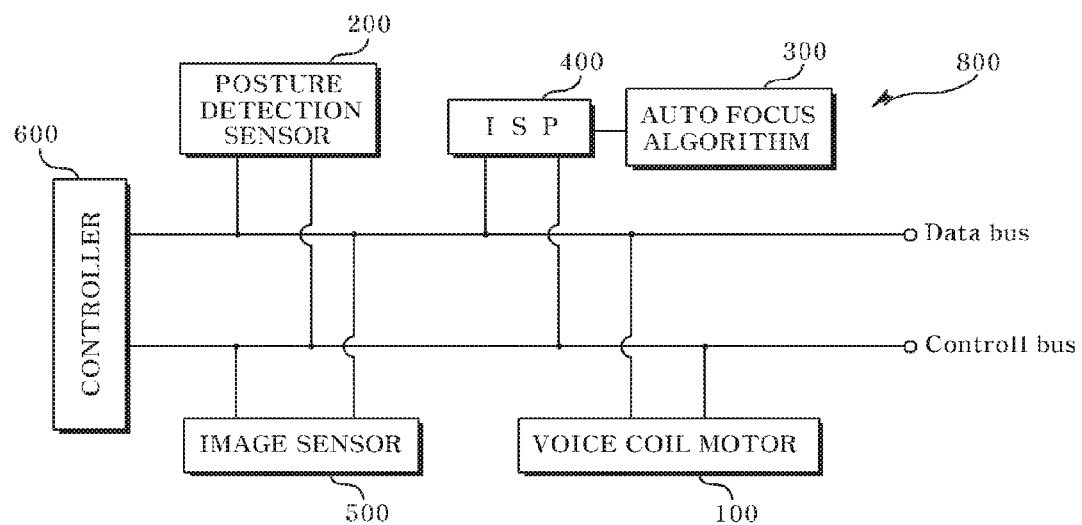
FIG. 1 is a block diagram illustrating a camera module according to a first exemplary embodiment of the present disclosure.
Figure 2:
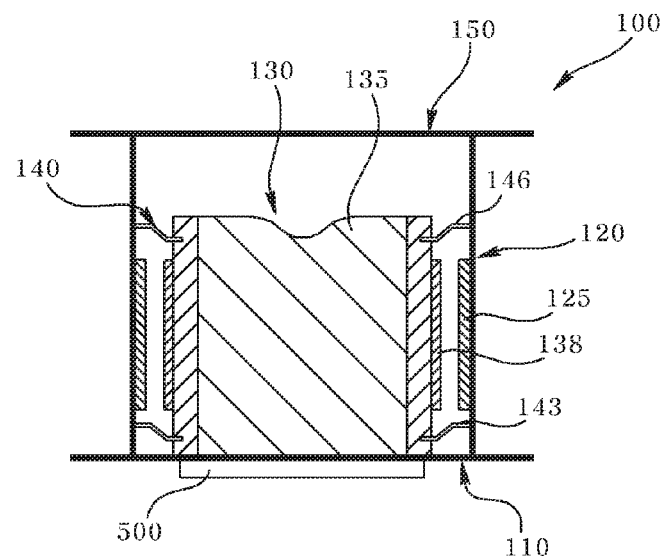
FIG. 2 is a schematic cross-sectional view illustrating a VCM of FIG. 1.

FIG. 1 is a block diagram illustrating a camera module according to a first exemplary embodiment of the present disclosure, and FIG. 2 is a schematic cross-sectional view illustrating a VCM of FIG. 1.

Referring to FIGS. 1 and 2, a camera module (800) includes a VCM (Voice Coil Motor, 100) driven to one direction, a posture detection sensor (200), an auto focus algorithm (300), an ISP (Image Signal Processor, 400), an image sensor (500) and a controller (600).

Referring to FIG. 2, the VCM (100) performs an auto focusing operation by driving a lens to one direction. That is, a lens mounted on the VCM (100) is moved to a direction ascending from abase (110, described later), and performs the auto focusing operation between the lens and the image sensor (500) during the moving process. The VCM (100) includes abuse (110), a stator (120), a rotor (130), an elastic member (140) and a cover (150).

The base takes a shape of a plate centrally formed with an opening passing light, and functions as a bottom stopper of the rotor (130). The base (110) may be arranged at a rear surface or at a side distanced from the rear surface with the image sensor (500). The image sensor (500) converts light focused through the lens of the rotor (130) to a digital image or a video. The stator (120) is fixed to an upper surface of the base (110), and includes a first driving unit (125) generating a magnetic field. The stator (120) is formed therein with an accommodation space.

The first driving unit (125) in an exemplary embodiment of the present disclosure may include a coil formed by winding a long wire insulated by an insulation resin to generate a magnetic field in response to a current, for example. Alternatively, the first driving unit (125) may include a magnet generating a magnetic field. The first driving unit (125) of the stator (120) in an exemplary embodiment of the present disclosure includes a coil.

The rotor (130) is arranged inside the stator (120), and includes a lens (135). The rotor (130) is mounted at an external surface thereof with a second driving unit (138) generating a magnetic field.

In a case the first driving unit (125) of the stator (120) includes a coil in an exemplary embodiment of the present disclosure, the second driving unit (138) of the rotor (130) may include a magnet. Alternatively, in a case the first driving unit (125) of the stator (120) includes a magnet, the second driving unit (138) of the rotor (130) may include a coil. The second driving unit (138) of the rotor (130) in an exemplary embodiment of the present disclosure includes a magnet, for example.

The elastic member (140) is fixed at one side to the rotor (130), and is fixed to the stator (120) at the other side opposite to the one side, and elastically supports the rotor (130). In an exemplary embodiment of the present disclosure, the elastic member (140) may include a first elastic member (143) formed at a bottom surface of a periphery of the rotor (130), and a second elastic member (146) formed at an upper surface of the periphery of the rotor (130). The elastic member (140) causes the rotor (130) to contact an upper surface of the base (110), in a case no driving signal is applied to the first driving unit (125) of the stator (120) or the second driving unit (138) of the rotor (130).

That is, the elastic member (140) provides a force to the rotor (130) to a direction facing the base, in a case no driving signal is applied to the first driving unit (125) of the stator (120) or the second driving unit (138) of the rotor (130). Thus, in an exemplary embodiment of the present disclosure, an electromagnetic force greater than an elasticity force of the elastic member (140) or a self-weight of the rotor (130) is needed to allow the rotor (130) to float from the base (110).

The cover (150) is fixed to the base (110), and wraps the stator (120) and the rotor (130) The cover (150) functions as an upper stopper stopping the rotor (130).

Referring to FIG. 1 again, the posture detection sensor (200) outputs a sensing signal by determining a posture of the VCM (100), in an exemplary embodiment of the present disclosure, the posture detection sensor (200) may include a gyro sensor detecting a direction of gravity, for example. The posture detection sensor (200) including the gyro sensor senses three postures of the VCM (100), for example. Of course, although the posture detection sensor (200) can sense three or more postures of the VCM (100), the posture detection sensor (200) in an exemplary embodiment of the present disclosure is explained to sense three postures, i.e., an 'up' posture, a 'side' posture and a 'down' posture, for convenience sake.

Figure 3:
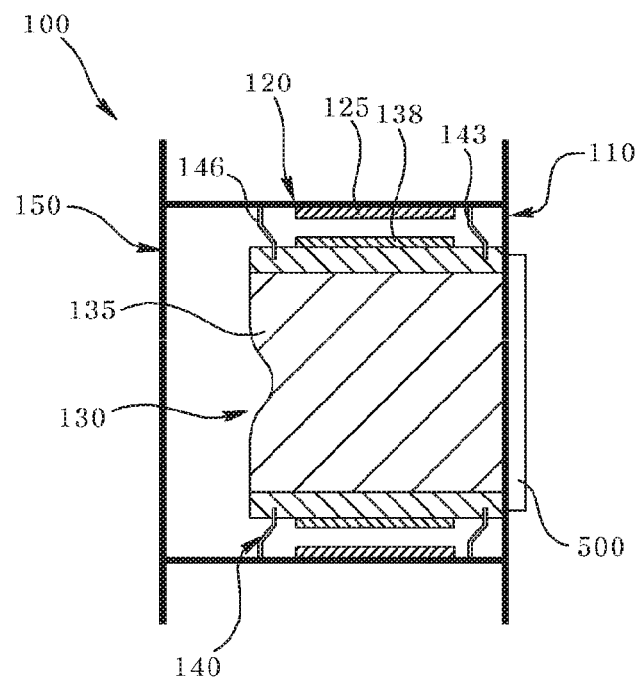
FIG. 3 is a cross-sectional view illustrating a side posture of a VCM of FIG. 2.
Figure 4:
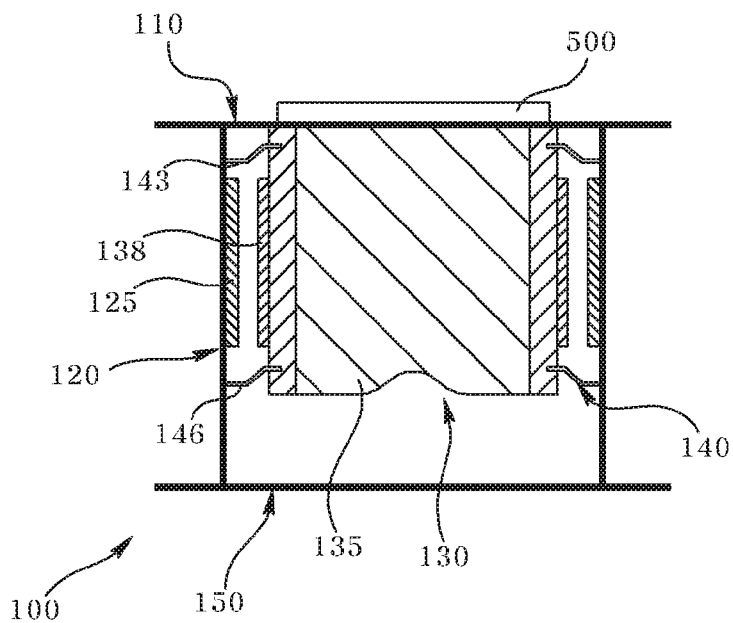
FIG. 4 is a cross-sectional view illustrating a down posture of a VCM of FIG. 2.

FIG. 3 is a cross-sectional view illustrating a side posture of a VCM of FIG. 2, and FIG. 4 is a cross-sectional view illustrating a down posture of a VCM of FIG.

Referring to FIGS. 3 and 4, the VCM (100) includes an 'up' posture as in FIG. 2, a 'side' posture as in FIG. 3, and a 'down' posture as in FIG.

The "up posture" illustrated in FIG. 2 is formed by an optical axis of the lens (135) of the rotor (130) of the VCM (100) being arranged to a direction perpendicular to a ground, and may be defined as a posture by the base (110) being arranged in opposition to the ground. The 'side posture' illustrated in FIG. 3 is formed by an optical axis of the lens (135) of the rotor (130) of the VCM (100) being arranged to a direction parallel with aground, and may be defined as a posture by the base (110) being arranged perpendicular to the ground. Furthermore, the 'down posture' illustrated in FIG. 4 is formed by an optical axis of the lens (135) of the rotor (130) of the VCM (100) being arranged to a direction perpendicular to a ground, and may be defined as a posture by the cover (150) being arranged in opposition to the ground.

The auto focus algorithm (300) is electrically connected to the ISP (400). The auto focus algorithm (300) outputs a detection signal by detecting an optimum focus value of the VCM (100) in response to a distance to an object in order to realize an accurate auto focusing and a quick response time of the auto focusing. The auto focus algorithm (300) may be formed in a shape of an algorithm inside the ISP (400), or may be independently used or separately used from the ISP (400).

Particularly, in an exemplary embodiment of the present disclosure, the auto focus algorithm (300) outputs a detection signal by detecting an optimum focus value between the lens (135) of the rotor (130) of the VCM (100) and the image sensor (500) in response to the abovementioned postures of the VCM (100) determined by the posture detection sensor (200). The auto focus algorithm (300) may be formed in the number corresponding to the number of postures of the VCM (100), for example.

The ISP (400) outputs a driving signal for driving the VCM (100) in response to the detection signal outputted by the auto focus algorithm (300), and the driving signal outputted by the ISP (400) is provided to the VCM (100) through a driving unit (not shown), where the rotor (130) of the VCM (100) is driven in response to the driving signal.

Referring to FIG. 1 again, the controller (500) is connected to the VCM (100), the posture detection sensor (200), the auto focus algorithm (300), the ISP (Image Signal Processor, 400) and the image sensor (500) via a data bus and/or a control bus.

Hereinafter, an auto focusing method of a camera module will be illustrated and explained with reference to the accompanying drawings, using a VCM contacted, by a rotor, to a base by an elastic member, in a case no driving signal is applied.

Figure 5:
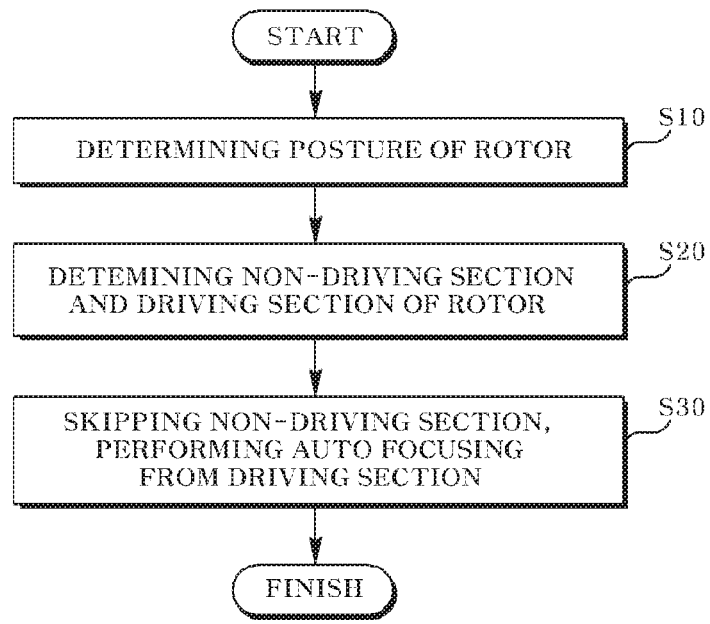
FIG. 5 is a flowchart illustrating an auto focusing method of a camera module according to a first exemplary embodiment of the present disclosure.

FIG. 5 is a flowchart illustrating an auto focusing method of a camera module according to a first exemplary embodiment of the present disclosure.

Referring to FIGS. 1 and 5, in order to perform the auto focusing of a camera module, a step of determination is first performed on what type of posture the rotor is currently taking, in a case no driving current is applied to the VCM (100) (S10). The posture of the VCM (100) may be realized by the posture detection sensor (200) such as a gyro sensor, for example.

The posture detection sensor (200) outputs mutually different sensing signals in response to the postures of the VCM (100), e.g., the 'up' posture, the 'side' posture and the 'down' posture of the VCM (100). In a case the posture of the VCM (100) is determined by the posture detection sensor (200), a 'non-driving section' and a 'driving section' of the rotor (130) of the VCM (100) corresponding to the posture of the VCM (100) are determined by the ISP (400) and the auto focus algorithm (300) (S20).

Hereinafter, the 'non-driving section' is defined as a section where the rotor (130) is not driven even if a driving signal is applied to the VCM (100), and the 'driving section' is defined as a section where the rotor (130) is driven by a driving signal applied to the VCM (100). Now, the non-driving section and the driving section of the VCM (100) will be illustrated and explained with reference to FIGS. 6, 7 and 8.

Figure 6:
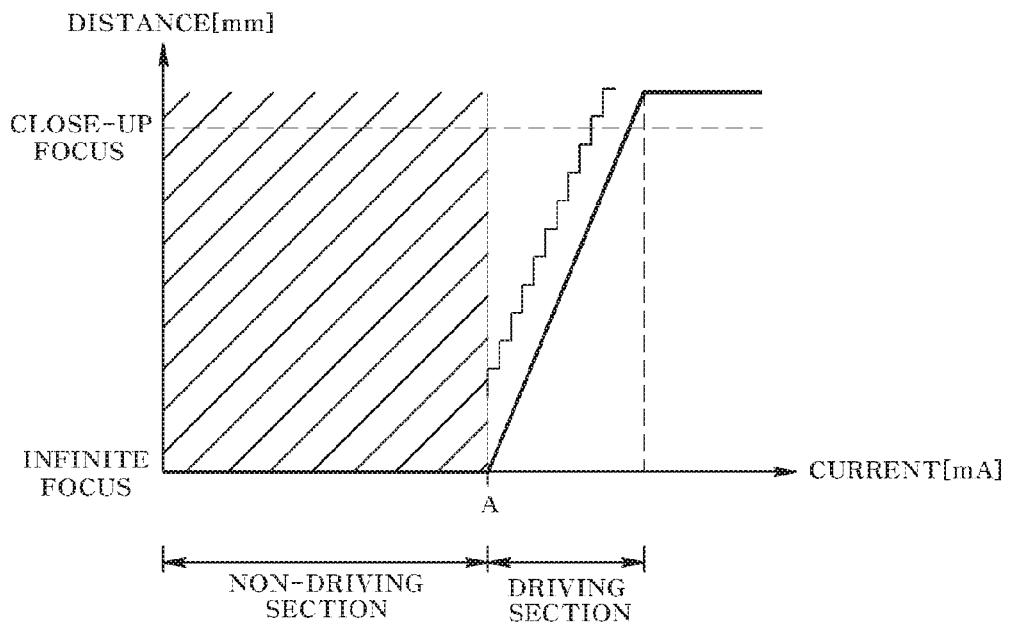
FIG. 6 is a graph illustrating a current-distance characteristic in a case a VCM of FIG. 1 is at an 'up' posture.

FIG. 6 is a graph illustrating a current-distance characteristic in a case a VCM of FIG. 1 is at an 'up' posture.

Referring to FIG. 6, an electromagnetic force greater than the self-weight of the rotor (130) and the elasticity force of the elastic member (140) is required to drive the rotor (130) of the VCM (100), because the VCM (100) is arranged in an 'up' posture. Thus, the rotor (130) is not driven by a current less than A [mA] in FIG. 6, such that a current section less than A [mA] is a non-driving section where the rotor (130) is not driven, where the auto focus operation is not realized due to the rotor (130) not being operated.

Meanwhile, under a current greater than A [mA], an electromagnetic force driving the rotor (130) is greater than the self-weight of the rotor (130) and the elasticity force of the elastic member (140) to drive the rotor (130), whereby a current section greater than A [mA] is a driving section where the rotor (130) can be driven, where the auto focus operation can be implemented because the rotor (130) is driven.

Figure 7:
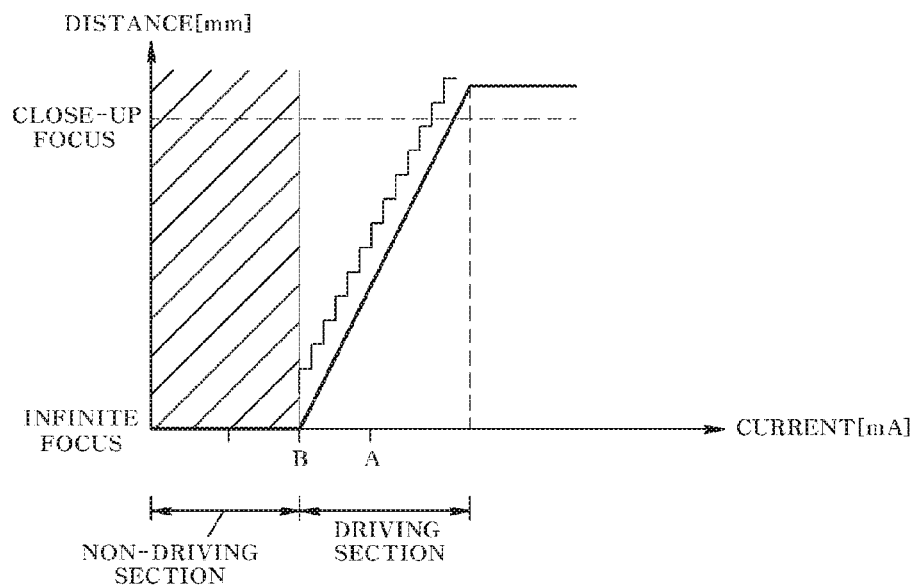
FIG. 7 is a graph illustrating a current-distance characteristic in a case a VCM of FIG. 1 is at a 'side' posture.

FIG. 7 is a graph illustrating a current-distance characteristic in a case a VCM of FIG. 1 is at a 'side' posture.

Referring to FIG. 7, an electromagnetic force greater than the self-weight of the rotor (130) and the elasticity force of the elastic member (140) is required to drive the rotor (130) of the VCM (100), because the VCM (100) is arranged in a 'side' posture. Thus, the rotor (130) is not driven by a current less than B [mA] (where, B is smaller than A) in FIG. 7, such that a current section less than B [mA] is a non-driving section where the rotor (130) is not driven, where the auto focus operation is not realized due to the rotor (130) not being operated.

In the exemplary embodiment of the present disclosure, the non-driving section of VCM (100) arranged in the 'side' posture of FIG. 7 is smaller than the non-driving section of VCM (100) arranged in the 'up' posture of FIG. 6. That is, the VCM (100) arranged in 'side' posture is driven by a smaller current than that of the VCM (100) arranged in 'up' posture.

Meanwhile, in a case a current greater than B [mA] is provided in FIG. 7, an electromagnetic force driving the rotor (130) is greater than the self-weight of the rotor (130) and the elasticity force of the elastic member (140) to drive the rotor (130), whereby a current section greater than B [mA] is a driving section where the rotor (130) can be driven, where the auto focus operation is now implemented, because the rotor (130) is driven.

Figure 8:
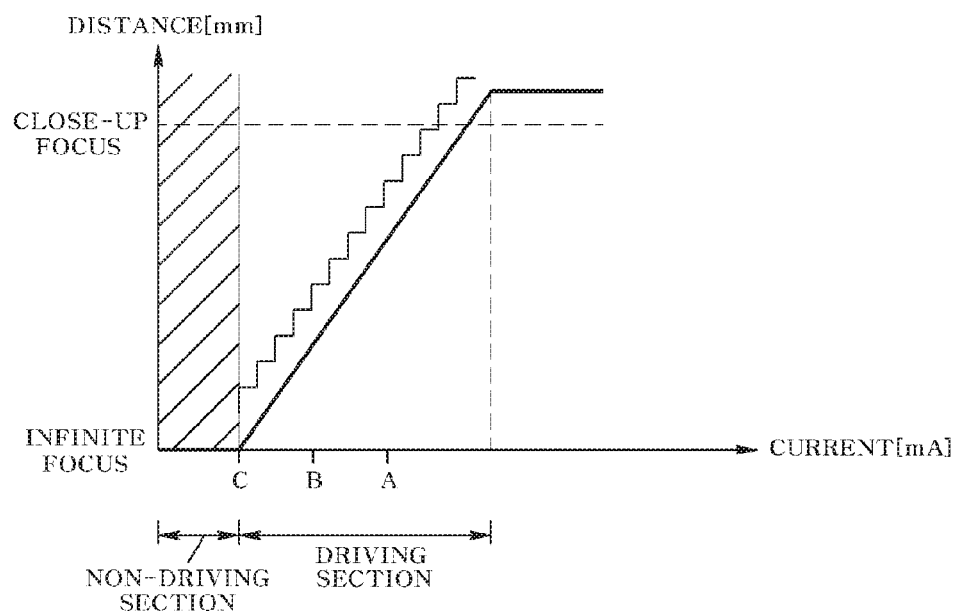
FIG. 8 is a graph illustrating a current-distance characteristic in a case a VCM of FIG. 1 is at a 'down' posture.

FIG. 8 is a graph illustrating a current-distance characteristic in a case a VCM of FIG. 1 is at a 'down' posture.

Referring to FIG. 8, an electromagnetic force greater than the self-weight of the rotor (130) and the elasticity force of the elastic member (140) is required to drive the rotor (130) of the VCM (100), because the VCM (100) is arranged in a 'down' posture. Thus, the rotor (130) is not driven by a current less than C [mA.] (where, C is smaller than B) in FIG. 8, such that a current section less than C [mA] is a non-driving section where the rotor (130) is not driven, where the auto focus operation is not realized due to the rotor (130) not being operated.

In the exemplary embodiment of the present disclosure, the non-driving section of VCM (100) arranged in the 'down' posture of FIG. 8 is smaller than the non-driving section of VCM (100) arranged in the 'side posture of FIG. 7. That is, the VCM (100) arranged in 'down' posture is driven by a smaller current than that of the VCM (100) arranged in 'side' posture.

Meanwhile, in a case a current greater than C [mA] is provided in FIG. 8, an electromagnetic force driving the rotor (130) is greater than the self-weight of the rotor (130) and the elasticity force of the elastic member (140) to drive the rotor (130), whereby a current section greater than C [mA] is a driving section where the rotor (130 can be driven, where the auto focus operation is now implemented, because the rotor (130) is driven.

In FIGS. 6, 7 and 8, the VCM (100) in the up posture, the VCM (100) in the side posture and the VCM (100) in the down posture respectively have the non-driving section and the driving section in common. That is, the VCM (100) commonly has the non-driving section and the driving section regardless of posture, where the auto focus operation is not realized at the non-driving section due to the rotor (130) not working, and the auto focus operation is realized only at the driving section due to the rotor (130) working.

Referring to FIG. 7 again, the posture of the VCM (100) is determined at S10, and the non-driving section and the driving section are determined (judged) by the ISP (400) and the auto focus algorithm (300) in response to the posture of the VCM (100) at S20.

In a case the posture of the VCM (100) is determined to determine the non-driving section and the driving section of the VCM (100), the auto focus operation to the non-driving section by the auto focus algorithm (300) is skipped to start the auto focus operation from the driving section. In a case the auto focus operation to the non-driving section by the auto focus algorithm (300) is skipped to start the auto focus operation from the driving section, a time required to implement the auto focus operation can be greatly reduced over the implementation of the auto focus operation starting from the non-driving section.

To be more specific, a focus value of the lens mounted on the rotor (130) is measured by the image sensor in the driving section determined by the posture of the VCM (100) for implementing the auto focus operation. In a case the focus value is not an optimum focus value, a current on the VCM (100) is increased or decreased as much as a predetermined step to move the rotor (130), and a DOFV (Difference of Focus Value), which is a difference value between a current focus value and a previous focus value is calculated to determine a focus adjustment state.

As a result of the determination, if the focus value is an optimum focus value, the rotor (130) is fixed to a current position, and the image sensor is used to convert an outside light to an image or a video.

Although the exemplary embodiment of the present disclosure has illustrated and explained that the posture of the VCM is determined by gyro sensor, the non-driving section of the rotor is skipped, and an auto focusing function is implemented using one auto focus algorithm performing the auto focusing operation from the driving section of the rotor, alternatively, the auto focusing function may be implemented using a plurality of auto focus algorithms in response to the posture of the VCM.

Figure 9:
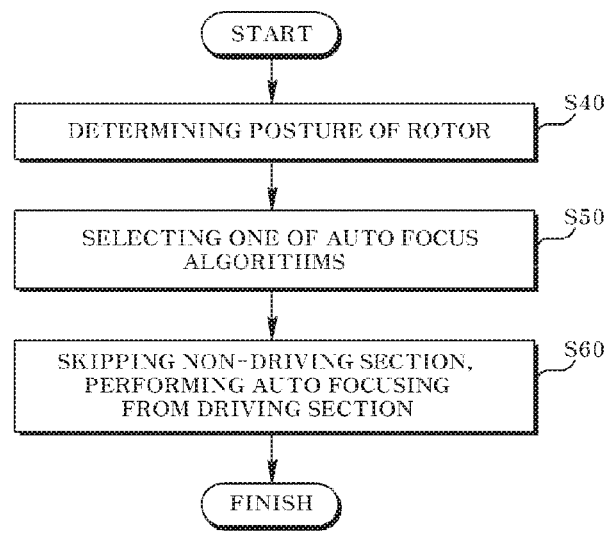
FIG. 9 is a flowchart illustrating an auto focusing method of a camera module according to another exemplary embodiment of the present disclosure.

To be more specific, referring to FIGS. 1 and 9, in order to implement the auto focusing operation, in a case a driving current is not applied from the camera module, a posture of the rotor (130) contacted to the base (100) by the elastic member (140), which is a reference plane, is first determined by using a position detection sensor such as a gyro sensor (S40).

Successively, one auto focus algorithm is selected from a plurality of auto focus algorithms formed in number corresponding to the posture of the rotor (130) of the VCM (100) (S50). An auto focusing operation of non-driving section of the rotor (130) despite the application of the driving current is skipped by the selected auto focus algorithm, and the auto focusing operation is performed from the driving section of the rotor driven by the driving current, and an auto focusing operation is performed within a shortened period of time over the auto focusing operation of the non-driving section (S60).

As apparent from the foregoing, the auto focusing operation of non-driving section of the rotor (130) despite the application of the driving current is skipped, and the auto focusing operation is performed only from the driving section of the rotor driven by the driving current, whereby auto focusing time can be advantageously shortened and a current consumption at the non-driving section is reduced to reduce the power consumption.

Second Exemplary Embodiment

Figure 10:
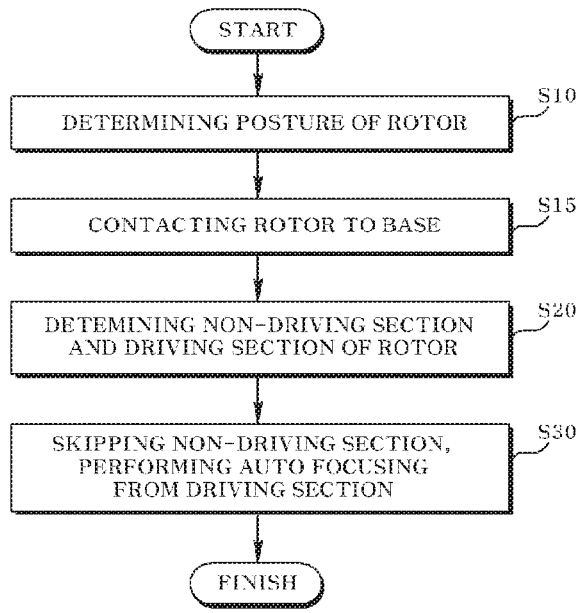
FIG. 10 is a flowchart illustrating an auto focusing method of a camera module according to a second exemplary embodiment of the present disclosure.

FIG. 10 is a flowchart illustrating an auto focusing method of a camera module according to a second exemplary embodiment of the present disclosure.

Referring to FIGS. 1 and 10, a step of determining what posture is currently taken by the VCM (100) is implemented in order to perform the auto focusing of the camera module (S10). The posture of the VCM (100) may be realized by the posture detection sensor (200) such as a gyro sensor.

The posture detection sensor (200) outputs mutually different sensing signals in response to the postures of the VCM (100), e.g., the 'up' posture, the 'side' posture and the 'down' posture of the VCM (100). In a case the posture of the VCM (100) is determined by the posture detection sensor (200), the auto focus algorithm (300) applies an initial driving signal to contact the rotor (130) to an upper surface of the base (110) (S15).

In a case the rotor (130) is contacted to an upper surface of the base (110), a 'non-driving section' and a 'driving section' of the rotor (130) of the VCM (100) corresponding to the posture of the VCM (100) are determined by the ISP (400) and the auto focus algorithm 300) (S20).

Hereinafter, the 'non-driving section' is defined as a section where the rotor (130) is not driven even if a driving signal is applied to the VCM (100), and the 'driving section' is defined as a section where the rotor (130) is driven by a driving signal applied to the VCM (100). Now, the non-driving section and the driving section of the VCM (100) will be illustrated and explained with reference to FIGS. 6, 7 and 8.

Figure 11:
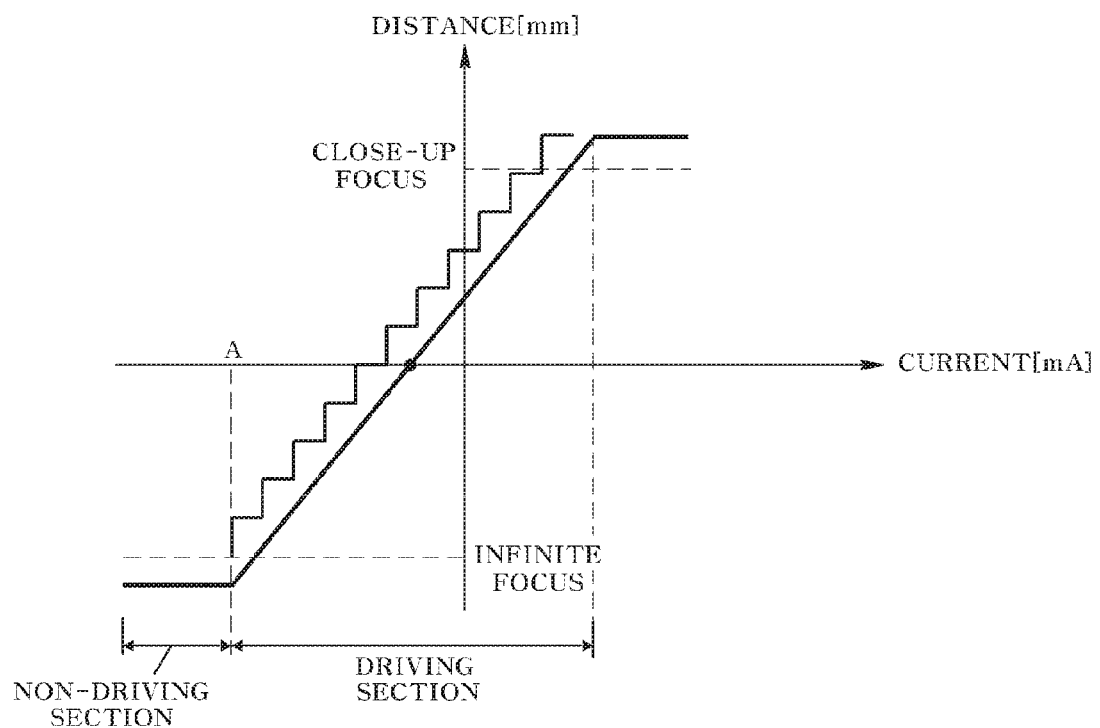
FIG. 11 is a graph illustrating a current-distance characteristic in a case a VCM of FIG. 1 is at an 'up' posture.

FIG. 11 is a graph illustrating a current-distance characteristic in a case a VCM of FIG. 1 is at an 'up' posture.

Referring to FIG. 11, an electromagnetic force greater than the self-weight of the rotor (130) and the elasticity force of the elastic member (140) is required to drive the rotor (130) of the VCM (100), because the VCM (100) is arranged in an 'up' posture. Thus, the rotor (130) is not driven by a current less than A [mA] in FIG. 11, such that a current section less than A [mA] is a non-driving section where the rotor (130) is not driven, where the auto focus operation is not realized due to the rotor (130) not being operated.

Meanwhile, under a current greater than A [mA], an electromagnetic force driving the rotor (130) is greater than the self-weight of the rotor (130) and the elasticity force of the elastic member (140) to drive the rotor (130), whereby a current section greater than A [mA] is a driving section where the rotor (130) can be driven, where the auto focus operation can be now implemented because the rotor (130) is driven.

Figure 12:
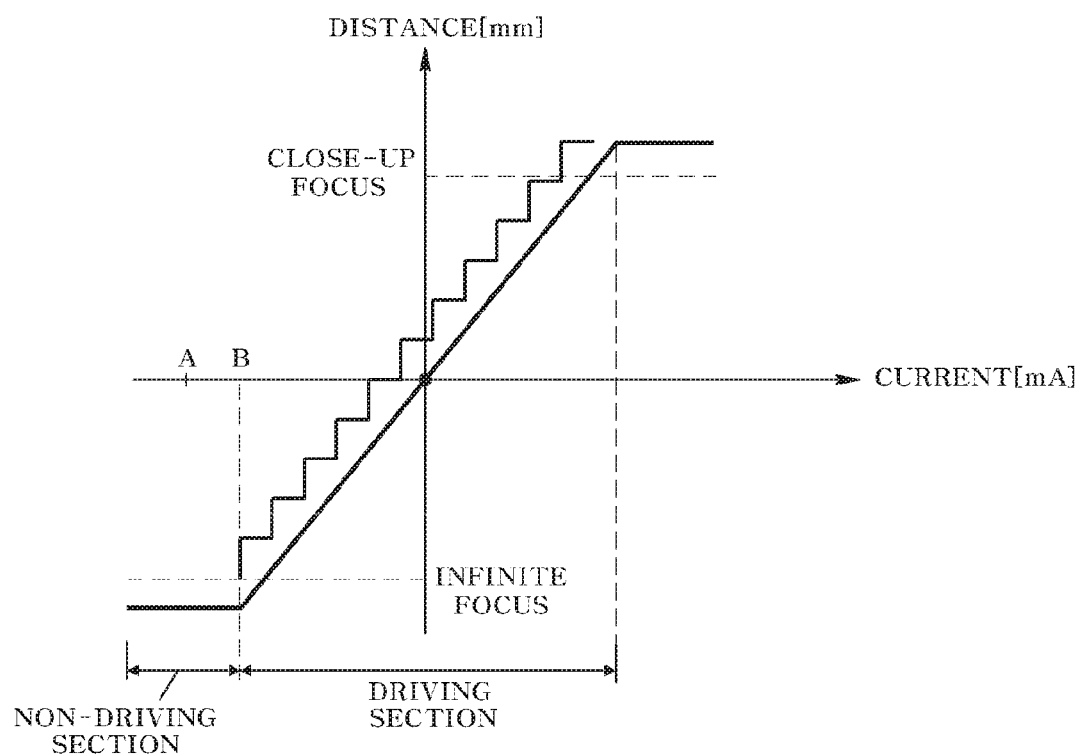
FIG. 12 is a graph illustrating a current-distance characteristic in a case a VCM of FIG. 1 is at 'side' posture.

FIG. 12 is a graph illustrating a current-distance characteristic in a case a VCM of FIG. 1 is at side posture.

Referring to FIG. 12, an electromagnetic force greater than the self-weight of the rotor (130) and the elasticity force of the elastic member (140) is required to drive the rotor (130) of the VCM (100), because the VCM (100) is arranged in a 'up' posture. Thus, the rotor (130) is not driven by a current less than B [mA] (where, B is smaller than A) in FIG. 12, such that a current section less than B [mA] is a non-driving section where the rotor (130) is not driven, where the auto focus operation is not realized due to the rotor (130) not being operated.

The VCM (100) arranged in 'side' posture is driven by a smaller current than that of the VCM (100) arranged in 'up' posture.

Meanwhile, in a case a current greater than B [mA] is provided as shown in FIG. 12, an electromagnetic force driving the rotor (130) is greater than the self-weight of the rotor (130) and the elasticity force of the elastic member (140) to drive the rotor (130), whereby a current section greater than B [mA] is a driving section where the rotor (130) can be driven, where the auto focus operation is now implemented, because the rotor (130) is driven.

Figure 13:
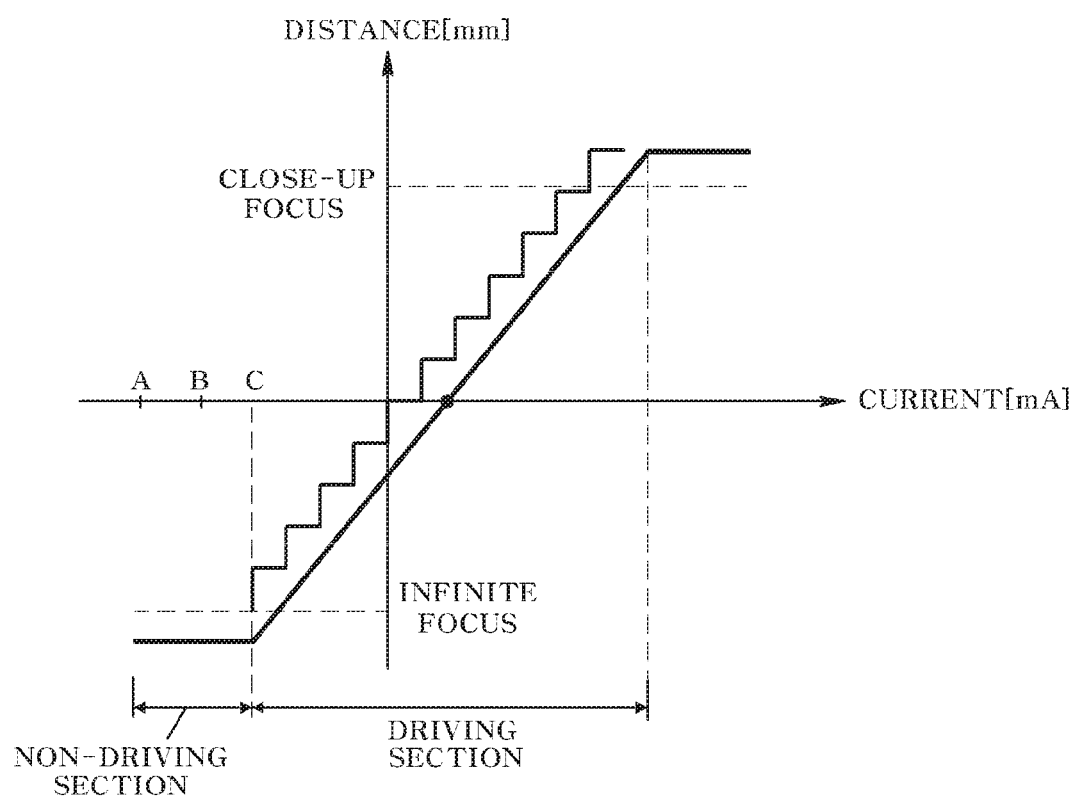
FIG. 13 is a graph illustrating a current-distance characteristic in a case a VCM of FIG. 1 is at 'down' posture.

FIG. 13 is a graph illustrating a current-distance characteristic in a case a VCM of FIG. 1 is at down posture.

Referring to FIG. 13, an electromagnetic force greater than the self-weight of the rotor (130) and the elasticity force of the elastic member (140) is required to drive the rotor (130) of the VCM (100), because the VCM (100) is arranged in a 'down' posture. Thus, the rotor (130) is not driven by a current less than C [mA] (where, C is smaller than B) in FIG. 13, such that a current section less than C [mA] is a non-driving section where the rotor (130) is not driven, where the auto focus operation is not realized due to the rotor (130) not being operated.

In the exemplary embodiment of the present disclosure, the VCM (100) arranged in 'down' posture is driven by a smaller current than that of the VCM (100) arranged in 'side' posture.

Meanwhile, in a case a current greater than C [mA] is provided as shown in FIG. 13, an electromagnetic force driving the rotor (130) is greater than the self-weight of the rotor (130) and the elasticity force of the elastic member (140) to drive the rotor (130), whereby a current section greater than C [mA] is a driving section where the rotor (130) can be driven, where the auto focus operation is now implemented, because the rotor (130) is driven.

In FIGS. 11, 12 and 13, the VCM (100) in the up posture, the VCM (100) in the side posture and the VCM (100) in the down posture respectively have the non-driving section and the driving section in common. That is, the VCM (100) commonly has the non-driving section and the driving section regardless of posture, where the auto focus operation is not realized at the non-driving section due to the rotor (130) not working, and the auto focus operation is realized only at the driving section due to the rotor (130) working.

Referring to FIG. 12 again, the posture of the VCM (100) is determined at S10, the rotor (130) is brought into contact with the upper surface of the base (110), and the non-driving section and the driving section are determined (judged) by the ISP (400) and the auto focus algorithm (300) in response to the posture of the rotor (130) of the VCM (100) at S20.

In a case the posture of the rotor (130) of the VCM (100) is determined to determine the non-driving section and the driving section of the VCM (100), the auto focus operation to the non-driving section by the auto focus algorithm (300) is skipped to start the auto focus operation from the driving section (S30). In a case the auto focus operation to the non-driving section by the auto focus algorithm (300) is skipped to start the auto focus operation from the driving section, a time required to implement the auto focus operation can be greatly reduced over the implementation of the auto focus operation starting from the non-driving section.

To be more specific, a focus value of the lens mounted on the rotor (130) is measured by the image sensor in the driving section determined by the posture of the VCM (100) for implementing the auto focus operation. In a case the focus value is not an optimum focus value, a current on the VCM (100) is increased or decreased as much as a predetermined step to move the rotor (130), and a DOFV (Difference of Focus Value), which is a difference value between a current focus value and a previous focus value is calculated to determine a focus adjustment state.

As a result of the determination, if the focus value is an optimum focus value, the rotor (130) is fixed to a current position, and the image sensor is used to convert an outside light to an image or a video.

Although the exemplary embodiment of the present disclosure has illustrated and explained that the posture of the VCM is determined by gyro sensor, the non-driving section of the rotor is skipped, and an auto focusing function is implemented using one auto focus algorithm performing the auto focusing operation from the driving section of the rotor, alternatively, the auto focusing function may be implemented using a plurality of auto focus algorithms in response to the posture of the VCM.

Third Exemplary Embodiment

Figure 14:
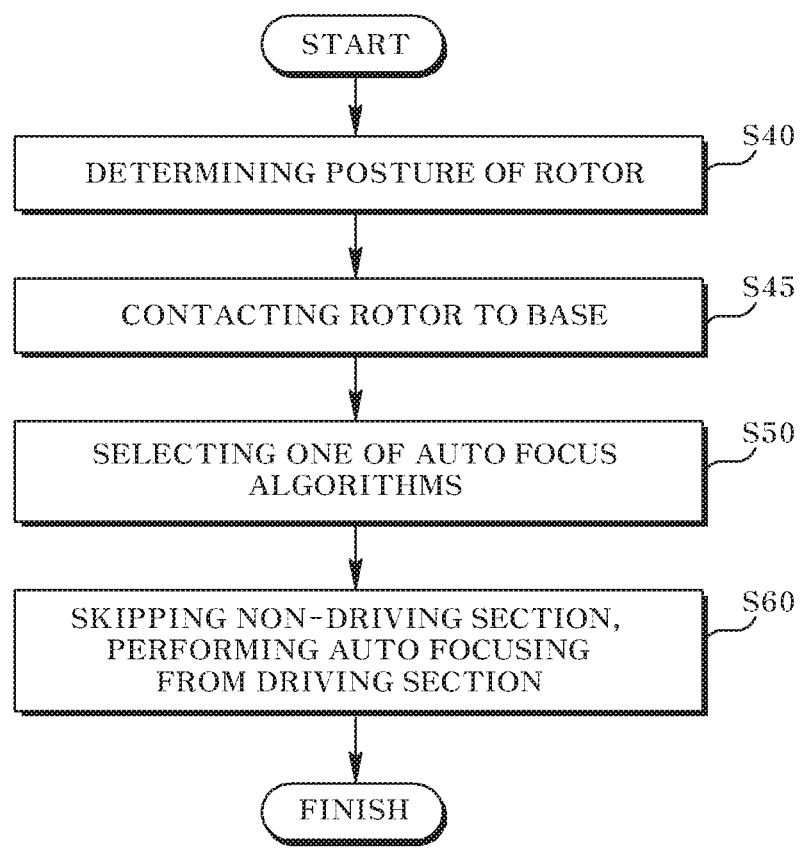
FIG. 14 is a flowchart illustrating an auto focusing method of a camera module according to a third exemplary embodiment of the present disclosure.

FIG. 14 is a flowchart illustrating an auto focusing method of a camera module according to a third exemplary embodiment of the present disclosure.

To be more specific, referring to FIGS. 1 and 14, in order to implement the auto focusing operation, in a case a driving current is not applied from the camera module, a posture of the rotor (130) contacted to the base (100) by the elastic member (140), which is a reference plane, is first determined by using a position detection sensor such as a gyro sensor (S40).

Successively, an initial driving current is applied to the rotor (130) in order to implement the auto focusing operation to cause the rotor (130) to be arranged an upper surface of the base (110) (S45).

Thereafter, one auto focus algorithm is selected from a plurality of auto focus algorithms formed in number corresponding to that of the postures of the rotor (130) of the VCM (100) (S50). The auto focus algorithm may include a first auto focus algorithm corresponding to the 'down' posture, a second auto focus algorithm corresponding to the 'side' posture, and a third auto focus algorithm corresponding to the 'up' posture.

An auto focusing operation of non-driving section of the rotor (130) despite the application of the driving current is skipped by the auto focus algorithm selected from the plurality of auto focus algorithms in response to the posture of the VCM (100), and the auto focusing operation is performed from the driving section of the rotor (130) driven by the driving current, and an auto focusing operation is performed within a shortened period of time over the auto focusing operation of the non-driving section (S60).

As apparent from the foregoing, the auto focusing operation of non-driving section of the rotor (130) despite the application of the driving current is skipped, and the auto focusing operation is performed only from the driving section of the rotor driven by the driving current, whereby auto focusing time can be effectively shortened and a current consumption at the non-driving section is reduced to reduce the power consumption.

The above-mentioned camera module and the auto focusing method of the camera module according to the present disclosure may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. An auto focusing method of a camera module that comprises an image sensor; a Voice Coil Motor (VCM) comprising a base disposed over the image sensor, a stator disposed over the base, a mover disposed inside the stator, an elastic member supporting the mover, and a driving unit configured to move the mover when a driving current is supplied; a posture detection sensor sensing three postures of the VCM, wherein the three postures are an up posture, a side posture, and a down posture; an auto focus algorithm outputting a detection signal by detecting an optimum focus value between a lens of the mover and the image sensor in response to a distance to an object and postures of the VCM determined by the posture detection sensor; an Image Signal Processor (ISP) outputting a driving signal for driving the VCM in response to the detection signal outputted by the auto focus algorithm, wherein the driving signal outputted by the ISP is supplied to the VCM and the mover is driven in response to the driving signal; and a controller connected to the VCM, the posture detection sensor, the auto focus algorithm, the ISP, and the image sensor via at least one of a data bus and a control bus; wherein the driving unit includes a coil and a magnet, wherein the mover is spaced apart from the base at an initial position when the driving current is not supplied, and wherein the driving current comprises a backward current and a forward current such that the mover is moved, the method comprising:

determining a posture of the VCM by the posture detection sensor, wherein the posture of the VCM is any one of an up posture where a lens mounted at the mover faces upwards, a side posture where an optical axis of the lens is in parallel with a ground, and a down posture where the lens is opposite to the ground, wherein the determining a posture of the VCM comprises determining whether the mover is in contact with the base;

moving the mover from the initial position to a reference position by supplying a reference current to the coil of the driving unit, wherein the mover moves toward the base from the initial position when the reference current is supplied to the coil of the driving unit, wherein the reference current has a first value when the posture of the VCM determined in the step of determining the posture of the VCM is the up posture, wherein the reference current has a second value when the posture of the VCM determined in the step of the determining the posture of the VCM is the side posture, wherein the reference current has a third value when the posture of the VCM determined in the step of the determining the posture of the VCM is the down posture, and wherein the second value is larger than the first value and the third value is larger than the second value;

outputting a detection signal by the auto focus algorithm by detecting an optimum focus value between the lens of the mover and the image sensor in response to a distance to an object and the posture of the VCM, wherein three auto focus algorithms are formed in response to the three postures of the VCM, respectively;

outputting a driving current for driving the VCM by the ISP in response to the detection signal outputted by the auto focus algorithm;

supplying the driving current outputted by the ISP to the VCM; and moving the mover of the VCM from the reference position to an optimum focus position in response to the driving current supplied to the VCM, wherein the step of moving the mover from the reference position to an optimum focus position comprises:

measuring a focus value of the lens of the mover while the mover is moved by increasing the driving current from the reference current, determining a focus adjustment state by calculating a Difference of Focus Value (DOFV) which is a value of difference between a current focus value of the lens and a previous focus value of the lens, while the mover is moved by increasing or decreasing the driving current when the focus value is not an optimum focus value, and moving the mover to the optimum focus position as a result of the step of determining the focus adjustment state, wherein one of the three auto focus algorithms is selected based on the posture of the VCM, and wherein the method further comprises skipping supplying a driving current corresponding to the non-driving section, and supplying a driving current corresponding to the driving section based on the selected auto focus algorithm.

2. The method of claim 1, wherein the step of moving the mover from the reference position to an optimum focus position comprises:
   increasing or decreasing the driving current when the mover is not in the optimum focus position.

3. The method of claim 1, wherein, at the step of determining a posture of the camera module, the posture of the camera module is detected by a gyro sensor.

4. The method of claim 1, wherein, at the step of moving the mover from the reference position to an optimum focus position, the driving current is gradually changed.

5. The method of claim 1, wherein, at the step of moving the mover from the reference position to an optimum focus position, the driving current is changed in steps.

6. The method of claim 1, wherein, at the step of moving the mover from the initial position to a reference position, the mover is in contact with the base when the backward current is supplied as the reference current to the coil of the driving unit.

* * * * *